(12) United States Patent
Cheng et al.

(10) Patent No.: US 9,952,999 B2
(45) Date of Patent: Apr. 24, 2018

(54) METHODS AND APPARATUS TO MANAGE CACHE MEMORY IN MULTI-CACHE ENVIRONMENTS

(71) Applicant: Intel Corporation, Santa Clara, CA (US)

(72) Inventors: Shiow-Wen Cheng, Portland, OR (US); Robert Joseph Woodruff, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 14/122,994

(22) PCT Filed: Sep. 19, 2013

(86) PCT No.: PCT/US2013/060634
§ 371 (c)(1),
(2) Date: Nov. 27, 2013

(87) PCT Pub. No.: WO2015/041653
PCT Pub. Date: Mar. 26, 2015

(65) Prior Publication Data
US 2015/0081945 A1    Mar. 19, 2015

(51) Int. Cl.
*G06F 12/14* (2006.01)
*G06F 13/40* (2006.01)
(Continued)

(52) U.S. Cl.
CPC .......... *G06F 13/4063* (2013.01); *G06F 9/526* (2013.01); *G06F 12/0815* (2013.01);
(Continued)

(58) Field of Classification Search
CPC ............. G06F 12/0871; G06F 12/0815; G06F 13/4063; G06F 2209/523; G06F 2214/284; G06F 9/526; G06F 2212/621
See application file for complete search history.

(56) References Cited

U.S. PATENT DOCUMENTS 5,805,809 A    9/1998  Singh et al.
5,944,789 A    8/1999  Tzelnic et al.
(Continued)

FOREIGN PATENT DOCUMENTS

JP    2006099802    4/2006
WO    9634340       10/1996

OTHER PUBLICATIONS

International Searching Authority, "International Search Report and Written Opinion," issued in connection with International Patent Application No. PCT/US2013/060634, dated Jun. 18, 2014 (10 pages).

(Continued)

*Primary Examiner* — David X Yi
*Assistant Examiner* — Zubair Ahmed
(74) *Attorney, Agent, or Firm* — Hanley, Flight and Zimmerman, LLC

(57) ABSTRACT

Methods, apparatus, systems and articles of manufacture are disclosed to manage cache memory in multi-cache environments. A disclosed apparatus includes a remote cache manager to identify a remote cache memory communicatively connected to a bus, a delegation manager to constrain the remote cache memory to share data with a host cache memory via the bus, and a lock manager to synchronize the host cache memory and the remote cache memory with a common lock state.

16 Claims, 12 Drawing Sheets

(51) Int. Cl.
*G06F 9/52* (2006.01)
*G06F 12/0815* (2016.01)
*G06F 12/0871* (2016.01)

(52) U.S. Cl.
CPC .... *G06F 12/0871* (2013.01); *G06F 2209/523* (2013.01); *G06F 2212/284* (2013.01); *G06F 2212/621* (2013.01)

(56) References Cited

U.S. PATENT DOCUMENTS

| | | | |
|---|---|---|---|
| 6,192,408 | B1 | 2/2001 | Vahalia et al. |
| 6,226,680 | B1* | 5/2001 | Boucher ............... G06F 5/10 709/230 |
| 2002/0199058 | A1 | 12/2002 | Ofek |
| 2005/0251500 | A1 | 11/2005 | Vahalia et al. |
| 2006/0080512 | A1 | 4/2006 | Hoover et al. |
| 2009/0187713 | A1 | 7/2009 | Zedlewski et al. |
| 2012/0158683 | A1* | 6/2012 | Whitehouse ...... G06F 17/30171 707/704 |
| 2012/0284369 | A1 | 11/2012 | Fishgait et al. |
| 2013/0238855 | A1 | 9/2013 | Satran et al. |
| 2014/0164549 | A1* | 6/2014 | Cudak ................ G06F 17/30 709/213 |

OTHER PUBLICATIONS

Wikipedia, "Lustre (file system)," retrieved from <http://en.wikipedia.org/w/index.php?title=Lustre_(file)_system) &oldid=559034352>, retrieved on Jun. 11, 2013 (9 pages).

Burrows, Mike, "The Chubby Lock Service for Loosely-Coupled Distributed Systems," Google Inc., OSDI'06: Seventh Symposium on Operating System Design and Implementation, Seattle, WA, Nov. 2006 (16 pages).

Wikipedia, "Google File System," retrieved from <http://en.wikipedia.org/w/index.php?title=Google_File_System &olfif=553727579>, retrieved on May 8, 2013 (3 pages).

Wikipedia, "POSIX," retrieved from <http://en.wikipedia.org/w/index.php?title=POSIX&oldid=552175757>, retrieved on May 8, 2013 (7 pages).

Wikipedia, "Expansion Card," retrieved from <http://en.wikipedia.org/w/index.php?title=Expansion_card_&oldid=556022170>, retrieved on May 23, 2013 (5 pages).

Wikipedia, "CacheFS," retrieved from <http://en.wikipedia.org/w/index.php?title=CacheFS&oldid=544615612>, retrieved on Jun. 11, 2013 (4 pages).

Wikipedia, "Network File System," retrieved from <http://en.wikipedia.org/w/index.php?title=Network_File_System &oldid=553868858>, retrieved on May 8, 2013 (6 pages).

Wikipedia, "Distributed Lock Manager," retrieved from <http://en.wikipedia.org/w/index.php?title=Distributed-lock-manager &oldid=552456190>, retrieved on May 8, 2013 (4 pages).

International Bureau, "International Preliminary Report on Patentability," issued in connection with International Patent Application No. PCT/US2013/060634, dated Mar. 31, 2016 (7 pages).

European Patent Office, Extended European Search Report, issued in connection with European Patent Application No. 13893829.5, dated Apr. 12, 2017, 9 pages.

State Intellectual Property Office of the People's Republic of China, "First Office Action," issued in connection with Chinese Patent Application No. 201380078978.3, dated Dec. 1, 2017, 29 pages.

European Patent Office, "Communication pursuant to Article 94(3) EPC" issued in connection with European patent application No. 13 893 829.5, dated Jan. 23, 2018, 8 pages.

Qin et al., "Optimizing Software Cache-coherent Cluster Architectures" Supercomputing IEEE/ACM Conference on Nov. 7, 1998, 16 pages.

* cited by examiner

METHODS AND APPARATUS TO MANAGE CACHE MEMORY IN MULTI-CACHE ENVIRONMENTS

FIELD OF THE DISCLOSURE

This disclosure relates generally to cache memory management, and, more particularly, to methods and apparatus to manage cache memory in multi-cache environments.

BACKGROUND

In recent years, coprocessor boards have been employed in computers (e.g., servers, personal computers, server farms, etc.) to expand one or more capabilities of such computers. The coprocessor boards may include any number of cores, memory and cache arranged on a bus-insertable add-in card. The coprocessor boards allow the computers to meet processing demands in a scalable manner as long as available bus interfaces reside on the host computer.

DETAILED DESCRIPTION

While coprocessor boards (sometimes referred to herein as Many Integrated Core (MIC) devices/nodes) may be inserted into a host computer platform having one or more available bus interfaces (e.g., Peripheral Component Interconnect (PCI), PCI Express (PCI-E), etc.), such coprocessor boards rely on one or more communication layers associated with the host platform to facilitate storage services. Typically, the coprocessor boards do not include on-board storage (e.g., hard disc drives) and instead rely on the host computer for storage resources. Host computer storage resources may include one or more hard disc drives, optical drives, solid state drives and/or network connectivity to external storage subsystems (e.g., network-attached storage (NAS)).

Figure 1:
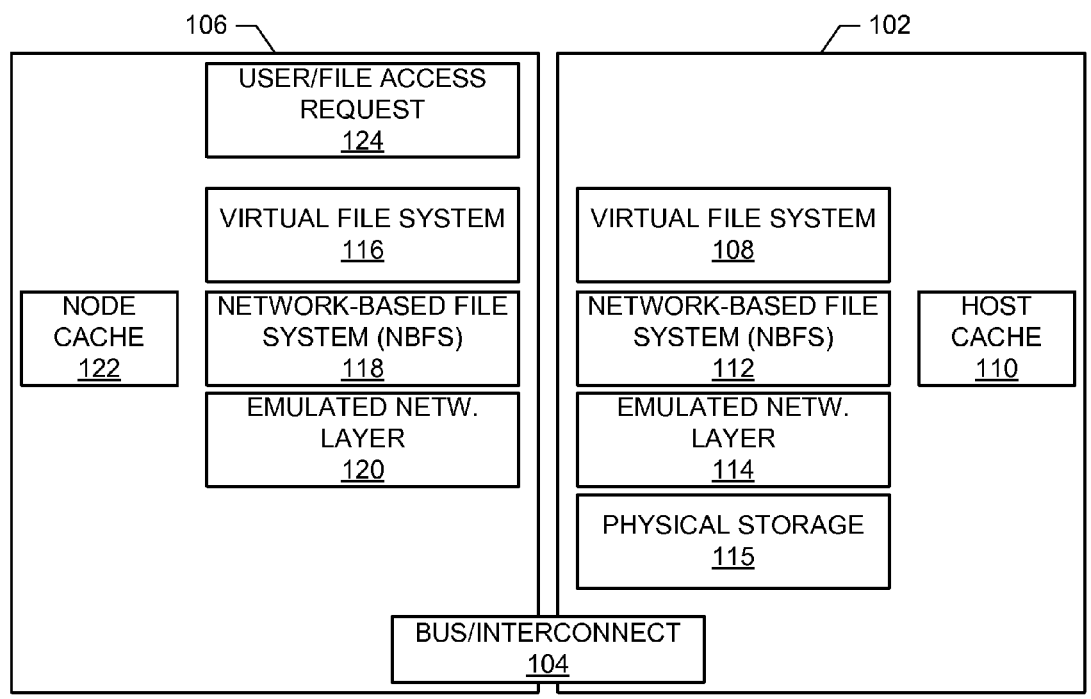
FIG. 1 is a schematic illustration of a known host computer configuration.

Host computer storage resources are typically accessed by the MIC nodes by adopting and/or otherwise incorporating emulated network stacks over the host bus as a network-based file system (NBFS) such as Network File System (NFS). However, NBFS implementation introduces software overhead, management complexity and bandwidth limitations that may burden the ability of one or more coprocessor boards when handling read and/or write operations to/from the host computer. FIG. 1 is a schematic illustration of a known host computer configuration 100 having one node connected thereto. In the illustrated example of FIG. 1, the configuration 100 includes a host computer system 102 having a bus 104 (e.g., PCI-E bus) communicatively connected to a node 106 (e.g., an Intel® Xeon Phi™ Coprocessor board). While the illustrated example of FIG. 1 includes a bus 104, example methods, apparatus, systems and/or articles of manufacture disclosed herein are not limited thereto. In some examples, the MIC may be connected via one or more clusters or a cluster fabric interconnect. In other examples, the bus 104 may be implemented via the InfiniBand® cluster interconnect and/or any other high-speed cluster interconnect. The example host 102 includes a virtual file system (VFS) 108 to facilitate cache management and communication with example cache 110, in which the example VFS 108 is communicatively connected to a file system manager 112, an emulated storage/network layer 114, and physical storage 115 (e.g., memory (RAM), disk, hard drive, etc.). The example storage/network layer 114 is communicatively connected to the example bus 104 to allow read and/or write operations to occur with file system layers on the example node 106.

The example node 106 includes a VFS 116, a file system manager 118 and an emulated storage/network layer 120 to facilitate cache management and communication with an example node cache 122. In the event a file access request 124 occurs (e.g., a user file access request invoked by one or more executing processes of the node, etc.), all of the example VFS 116, the file system manager 118 and the emulated storage/network layer 120 are traversed. As described above, the node adopts the NBFS mechanism of the host to facilitate storage read and/or write operations, which adds complexity and bandwidth limitations. For example, the NBFS 118 includes network stacks that require tuning to allow emulation on top of the bus 104 and/or a bus interface. Additionally, MIC nodes are typically optimized for computational speed and/or efficiency, and adding emulated network layers is not a native component that fits well within limited on-board management systems (e.g., system management controller (SMC)) of MIC nodes.

Figure 2:
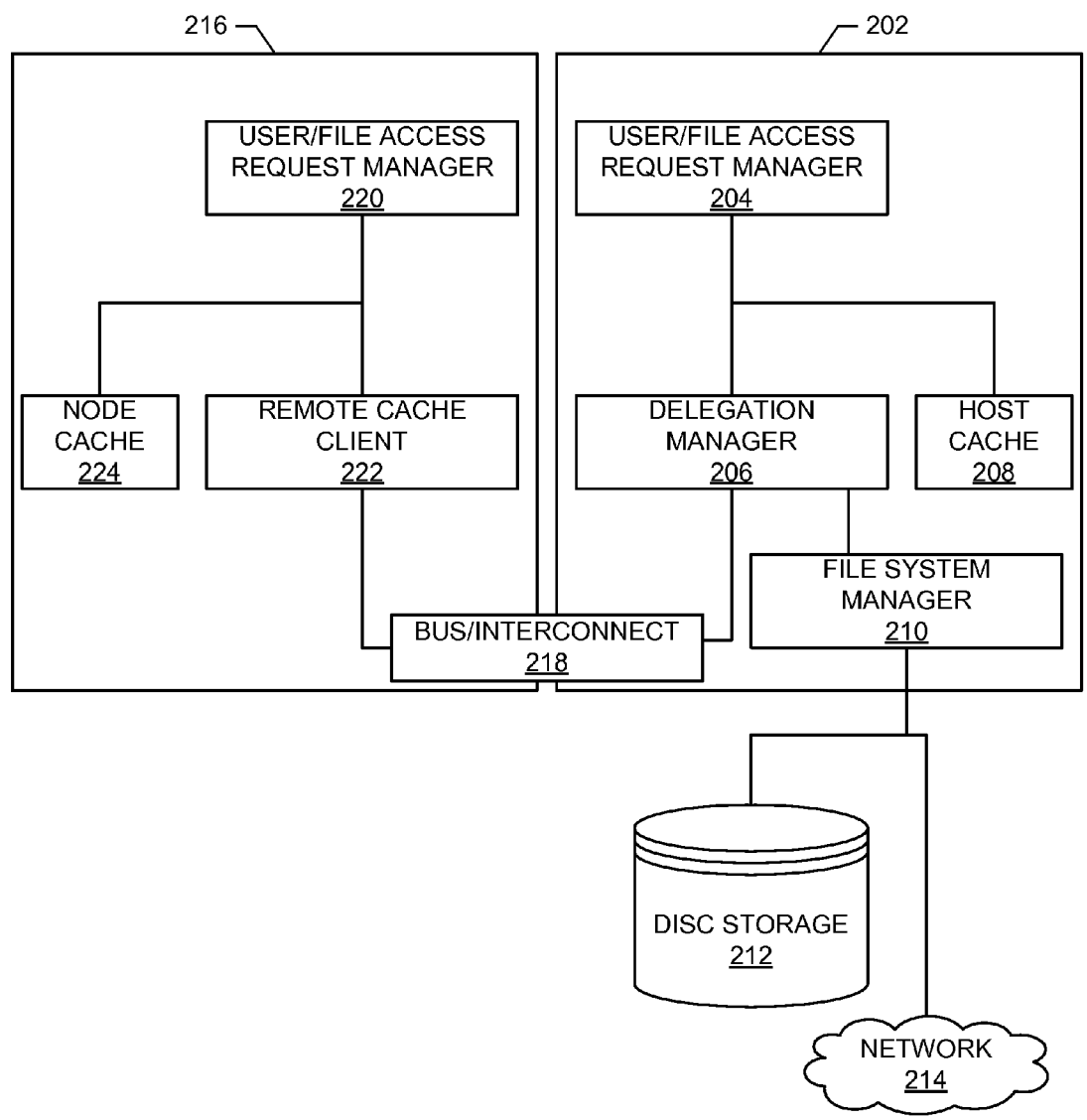
FIG. 2 is a schematic illustration of a host computer configuration to manage cache memory in multi-cache environments.

FIG. 2 is a schematic illustration of a host computer configuration 200 to manage cache memory in multi-cache environments. In the illustrated example of FIG. 2, the host configuration 200 includes a host computer 202 having a user/device file access request manager 204, a lock and cache delegation manager 206 (hereinafter "delegation manager"), cache memory 208 and a file system manager 210 communicatively connected to disc storage 212 and network storage 214. The example delegation manager 206 is communicatively connected to a node 216 via a bus 218 of the host computer 202. As described above, the example bus 218 may be implemented as a PCI bus, a PCI-E bus and/or any other type of bus or any type of high-speed interconnect, such as InfiniB and or similar cluster fabric interconnect. As also described above, the example node 216 may be a coprocessor board having any number of cores, such as a MIC by Intel® named Xeon Phi™ While the illustrated example of FIG. 2 includes a single node (i.e., node 216), any number of nodes may be implemented based on a number of available bus slots of the example host computer 202.

In the illustrated example of FIG. 2, the node 216 includes a user/device file access request manager 220, a remote cache client 222, and node cache memory 224. In operation, all read and/or write requests by the example host 202 and/or the example node(s) 216 are managed by the example delegation manager 206 via the example bus 218. In particular, the example delegation manager 206 bypasses, constrains, diverts, disables and/or otherwise blocks cache read/write requests that may traditionally be targeted to NBFS-based network layers associated with the example host 202. When a bus device (e.g., a MIC node) is detected by the example delegation manager 206, such as one or more nodes connected to the example bus 218, the example delegation manager 206 determines whether the newly added/attached bus device includes a remote cache client, such as the example remote cache client 222 of FIG. 2. If so, then the example delegation manager 206 disables and/or otherwise prevents network-based file access to the node to reduce and/or minimize bandwidth latency, and establishes node cache communication services via the example bus 218. In some examples, the emulated network layer 114 is retained for one or more other MIC functions. Additionally, in response to one or more read and/or write requests initiated by the example host 202 and/or one or more nodes (e.g., node 216), the example delegation manager 206 controls the cache behavior of both devices to operate as a shared cache, as described in further detail below. In other words, the example delegation manager 206 synchronizes a cache state between two separate cache devices at separate nodes to facilitate locked communication over the host platform bus (e.g., bus 218).

Figure 3:
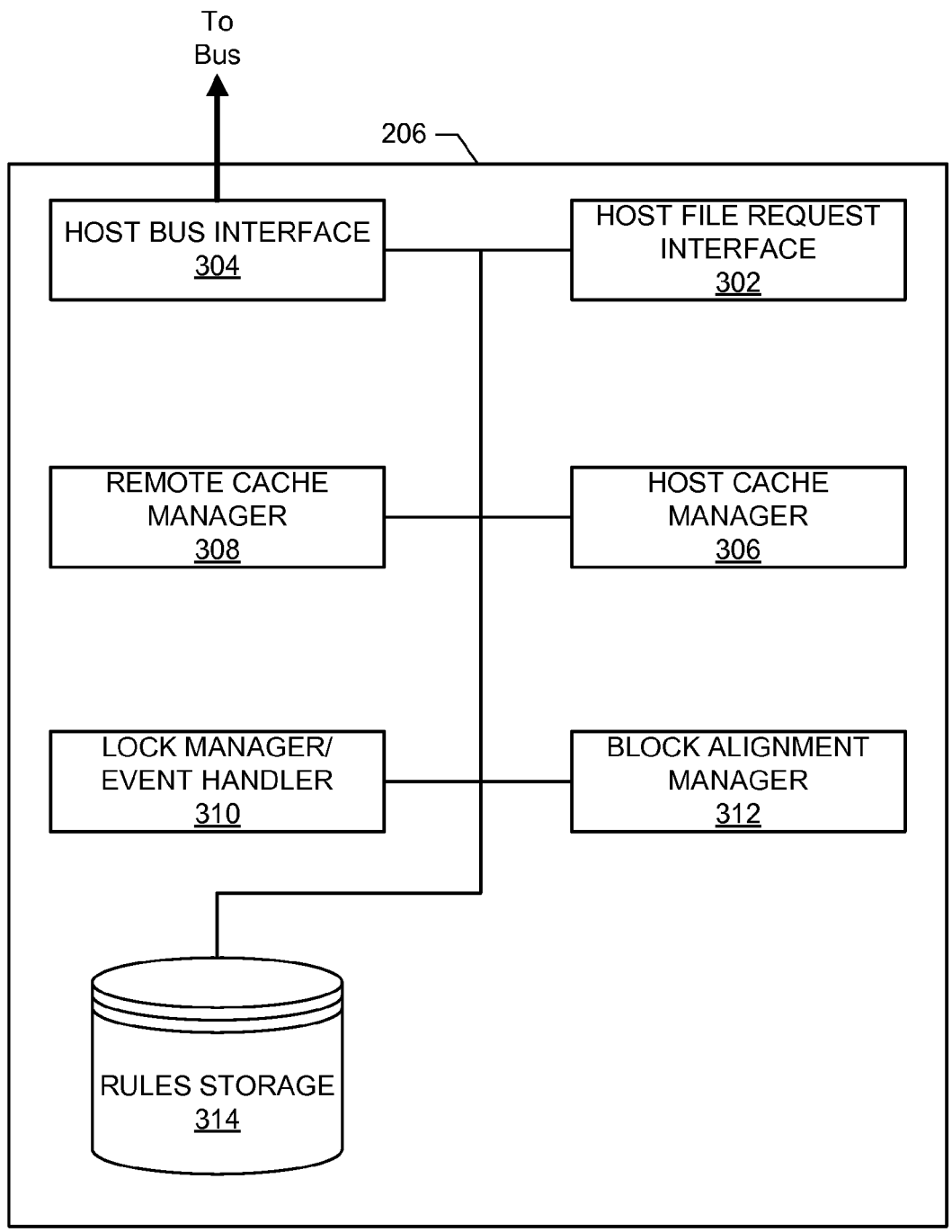
FIG. 3 is a schematic illustration of an example delegation manager of FIG. 2 to manage cache memory in multi-cache environments in a manner consistent with methods, apparatus, systems and articles of manufacture disclosed herein.

FIG. 3 is a schematic illustration of the example delegation manager 206 of FIG. 2. In the illustrated example of FIG. 3, the delegation manager 206 includes a host file request interface 302, a host bus interface 304, a host cache manager 306, a remote cache manager 308, a lock manager 310 and a block alignment manager 312. In operation, the example host bus interface 304 retrieves and/or otherwise receives one or more read/write requests from a node (e.g., the example node 216) on the bus 218. A read request from the node 216, for example, is retrieved by the example bus host interface 304 via the bus 218, and the example lock manager 310 is invoked to apply one or more locking rules. The one or more locking rules, as described in further detail below, establish a mutual and synchronized lock state between the node cache 224 of a requestor (e.g., the node 216 making a read request) and the host cache 208. Cache data transfers may then occur in a manner substantially faster than hard-disc read/write operation(s) and/or substantially faster than network-based data transfers. Additionally, because NBFS layer(s) are precluded (e.g., constrained, diverted, disabled) from communication participation, the relatively faster host bus 218 (e.g., PCI-express) improves communication speeds as compared with relatively slower emulated network-based standards (e.g., Ethernet).

After one or more shared cache transfers, the example host file request interface 302 interacts with the example host file system manager 210 to manage writes and/or reads to/from relatively slower storage devices (e.g., hard disc, NAS, etc.). Such relatively slower storage devices may be invoked by the example host file request interface 302 independently of shared cache activities to avoid one or more bottlenecks. The example remote cache manager 308 and the example host cache manager 306 facilitate data transfer between the example node cache 224 and host cache 208, respectively. Additionally, current lock state values may be queried by the example remote cache manager 308 and the example host cache manager 306 so that the example lock manager 310 can invoke the correct state transition rules.

In some examples, a read and/or a write request may include a byte range that spans two or more blocks. Generally speaking, each block of cache memory (e.g., the node cache 224, the host cache 208, additional node cache devices, etc.) can include, for example, 512 bytes, in which read and write operations occur on a block-by-block basis. In other words, cache read/write operations are not conducted in portions of a block and, instead, require the whole block (512 bytes) to be read/written. While the illustrated examples disclosed herein refer to systems having block sizes of 512 bytes, example methods, systems, apparatus and/or articles of manufacture disclosed herein are not limited thereto. In the event of a read/write request that spans more than one block, such read/write requests are unaligned. For example, in the event of a read request of byte 15, then all of bytes 1-512 (i.e., the first block) are actually retrieved and specific information/data associated with byte 15 may be extracted thereafter. On the other hand, in the event a read operation is interested in bytes 500-524, then the read operation is unaligned because bytes 1-512 are associated with the first block, and bytes 513-1024 are associated with the second block. As such, a read operation focused on a series of bytes spanning two or more blocks requires reading each associated block in its entirety.

Figure 4:
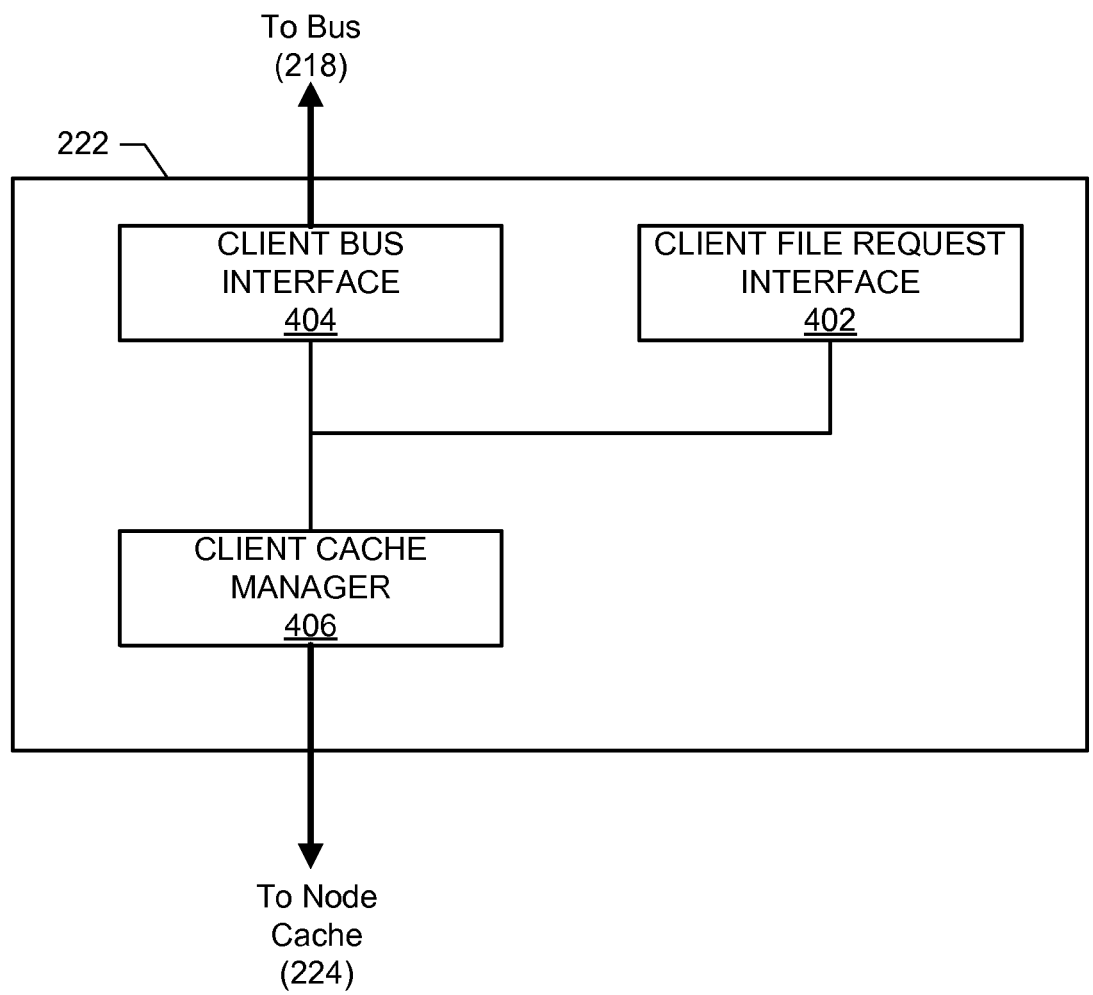
FIG. 4 is a schematic illustration of an example remote cache client of FIG. 2 to manage cache memory in multi-cache environments in a manner consistent with methods, apparatus, systems and articles of manufacture disclosed herein.

FIG. 4 is a schematic illustration of the example remote cache client 222 of FIG. 2. In the illustrated example of FIG. 4, the remote cache client 222 includes a client request interface 402, a client bus interface 404 and a client cache manager 406 to write/read to/from the example node cache 224. In operation, the example client request interface 402 interacts with the example user/device file access request manager 220 to respond to one or more read/write requests by the node 216. The example client bus interface 404 is communicatively connected to the bus 218 to facilitate read/write operations from/to the bus 218 in response to requests/commands from the host 202, and the example client cache manager 406 is communicatively connected to the example node cache 224 to facilitate synchronized write/read operations to/from the node cache 224.

While an example manner of implementing the host computer configuration 200 of FIG. 2 is illustrated in FIGS. 2-4, one or more of the elements, processes and/or devices illustrated in FIGS. 2-4 may be combined, divided, rearranged, omitted, eliminated and/or implemented in any other way. Further, the example file access request manager 204, the example delegation manager 206, the example cache memory 208, the example file system manager 210, the example node access request manager 220, the example remote cache client 222, the example node cache memory 224, the example host file request interface 302, the example host bus interface 304, the example host cache manager 306, the example remote cache manager 308, the example lock manager 310, the example alignment manager 312, the example client request interface 402, the example client bus interface 404, and/or, more generally, the example client cache manager 406 of FIGS. 2-4 may be implemented by hardware, software, firmware and/or any combination of hardware, software and/or firmware. Thus, for example, any of the example file access request manager 204, the example delegation manager 206, the example cache memory 208, the example file system manager 210, the example node access request manager 220, the example remote cache client 222, the example node cache memory 224, the example host file request interface 302, the example host bus interface 304, the example host cache manager 306, the example remote cache manager 308, the example lock manager 310, the example alignment manager 312, the example client request interface 402, the example client bus interface 404, and/or, more generally, the example client cache manager 406 of FIGS. 2-4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example file access request manager 204, the example delegation manager 206, the example cache memory 208, the example file system manager 210, the example node access request manager 220, the example remote cache client 222, the example node cache memory 224, the example host file request interface 302, the example host bus interface 304, the example host cache manager 306, the example remote cache manager 308, the example lock manager 310, the example alignment manager 312, the example client request interface 402, the example client bus interface 404, and/or, more generally, the example client cache manager 406 of FIGS. 2-4 is/are hereby expressly defined to include a tangible computer readable storage device or storage disk such as a memory, a digital versatile disk (DVD), a compact disk (CD), a Blu-ray disk, etc. storing the software and/or firmware. Further still, the example delegation manager 206 and remote cache client 222 of FIG. 2 may include one or more elements, processes and/or devices in addition to, or instead of, those illustrated in FIGS. 3 and 4, and/or may include more than one of any or all of the illustrated elements, processes and devices.

Flowcharts representative of example machine readable instructions for implementing the host computer configuration 200 of FIG. 2 is shown in FIGS. 5, 6, 7A, 7B, 8A, 8B and 8C. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 5, 6, 7A, 7B, 8A, 8B and 8C, many other methods of implementing the example host computer configuration 200 may alternatively be used. For example, the order of execution of the blocks may be changed, and/or some of the blocks described may be changed, eliminated, or combined.

As mentioned above, the example processes of FIGS. 5, 6, 7A, 7B, 8A, 8B and 8C may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5, 6, 7A, 7B, 8A, 8B and 8C may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 5:
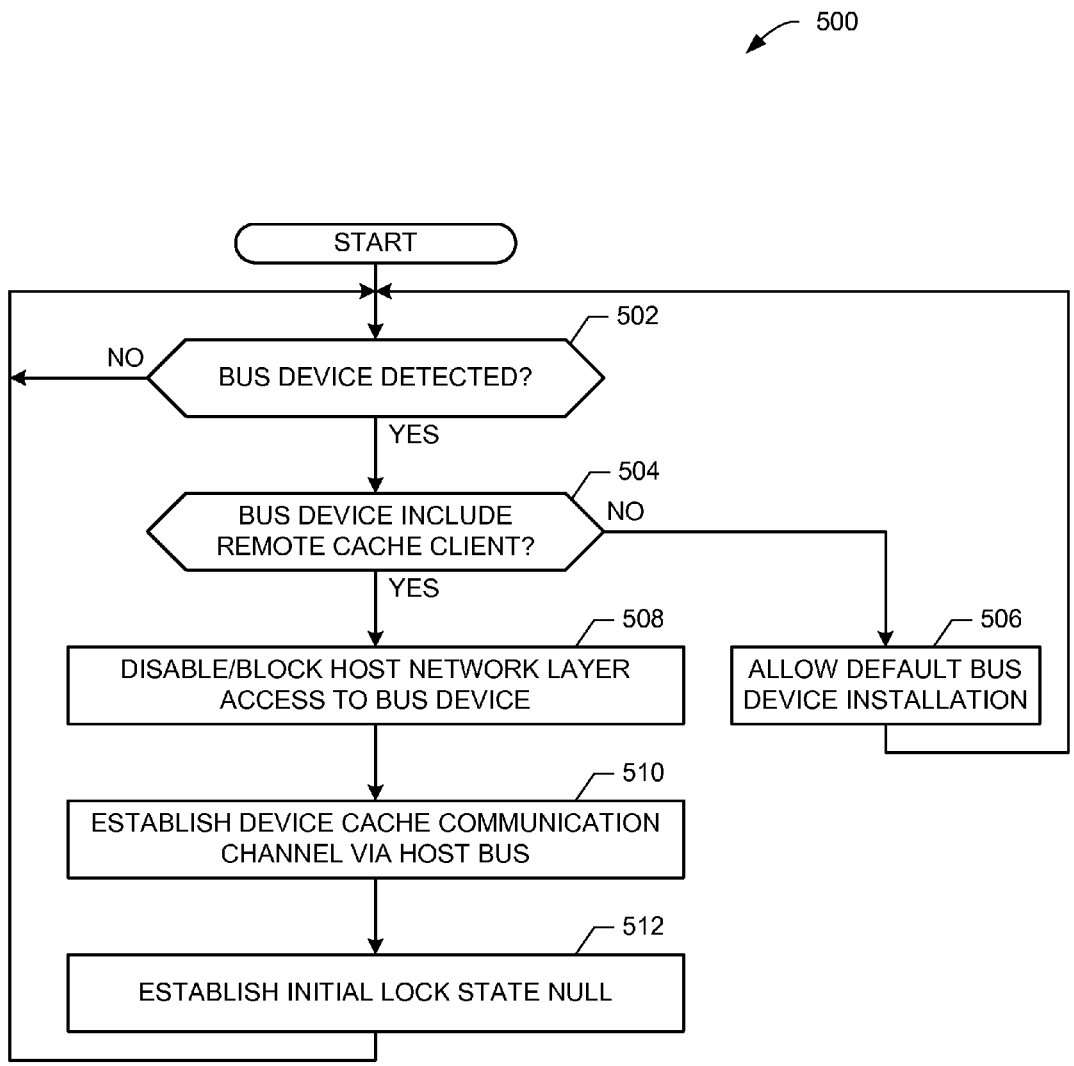
FIGS. 5, 6, 7A, 7B, 8A, 8B and 8C are flowcharts representative of example machine readable instructions which may be executed to manage cache memory in multi-cache environments.

The program 500 of FIG. 5 begins at block 502 where the example delegation manager 206 determines whether a bus device is added and/or otherwise detected as connected to the example bus 218. If not, the example delegation manager 206 continues to monitor the example bus 218 for one or more additional nodes (e.g., MIC nodes) (block 502). In the event a device is detected on the example bus 218 by the example delegation manager 206, the example host bus interface 304 determines whether the detected device includes a remote cache client (block 504), such as the example remote cache client 222 of FIGS. 2 and 4. In some examples, the remote cache client may be identified in response to a query sent by the example delegation manager 206 containing a query code. If the example remote cache client 222 responds to the query code with an authorized response code, then the newly added bus device may be deemed to be authorized to employ coherency model communication procedures in a manner consistent with FIGS. 6, 7A, 7B, 8A, 8B and 8C, as described in further detail below. If not, the newly added device is not deemed to participate in example methods, systems, apparatus and/or articles of manufacture disclosed herein, and is allowed to proceed with any default procedure(s) it may have with the example host 202 (block 506). In some examples, an authorization code sent by a participating remote node is verified and/or otherwise validated prior to allowing one or more network-based layers from being constrained, blocked and/or otherwise bypassed. On the other hand, if the example host bus interface 304 identifies a corresponding remote cache client (block 504), then the example delegation manager 206 disables, constrains, diverts, bypasses, substitutes and/or otherwise blocks one or more host network-based file access attempts via emulated network stacks with the newly added bus device (block 508). In some examples, one or more other system management operation(s) are permitted, such as a ping operation. Additionally, some example employ portable operating system interface (POSIX) standards to assist with one or more lock support commands.

As described above, rather than rely-on and/or otherwise employ standard/traditional network layers facilitated by the host, the example host bus interface 304 and the client bus interface 404 establish a communication and shared cache lock rule-set to accomplish synchronized device cache data sharing via the example bus 218 (block 510). The newly detected device (e.g., MIC node) cache device is set to its initial state by the example lock manager 308 (block 512), in which corresponding portions of the host cache 208 are synchronized to have the same state (e.g., initial state NULL). Control returns to block 502 to continue to monitor the example bus 218 for the addition of one or more other node(s).

Example methods, apparatus, systems and articles of manufacture disclosed herein establish a coherency model that manages lock states to be synchronized between the example host cache 208 and each connected node cache, such as the example node cache 224 of FIG. 2. Data transfers over the example bus 218 rather than an NBFS (e.g., 112, 118) between cache devices may be associated with four (4) lock states (NULL, AVAIL (available), SHARE (read) and EXCLUSIVE (write)). An EXCLUSIVE lock corresponds to a write operation for a specified byte range, in which shared cache entries are invalidated. When the EXCLUSIVE lock is released, the associated cache contents are flushed to the host (host node) so that such contents can be moved to a final storage destination.

A lock owner may be identified by a node identifier (ID) and a process ID descriptor. Additionally, a lock may be identified by a file ID on the host node, which may further include a byte-range descriptor (brd). As described above, the byte-range contains information about file offsets and/or block counts that are associated with read/write input/output (I/O) calls. In the event of unalignment, a lock may be split into multiple sub-locks based on the brd.

Transitions between the example four (4) lock states occur in a manner consistent with Table 1, shown below.

TABLE 1

| State | Description | Trasition to Target State | | | |
|---|---|---|---|---|---|
| | | NULL | AVAIL | SHARE | EXCLUSIVE |
| NULL | Lock does not exist | n/a | n/a | (N-S) | (N-E) |
| AVAIL | Lock owner with NULL PID descriptor | (A-N) | n/a | (A-S) | (A-E) |
| SHARE | Allow multiple readers | (S-N) | (S-A) | (S-S) | (S-E) |
| EXCLUSIVE | Only one writer process allowed | (E-N) | n/a | (E-S) | (E-E) |

In the illustrated example of Table 1, each of the four lock states may transition to a subsequent state. Each state may be associated with two (2) different modes, (a) a pending mode when physical I/O (e.g., to/from storage devices) is in progress and (b) a granted mode when I/O has completed.

Figure 6:
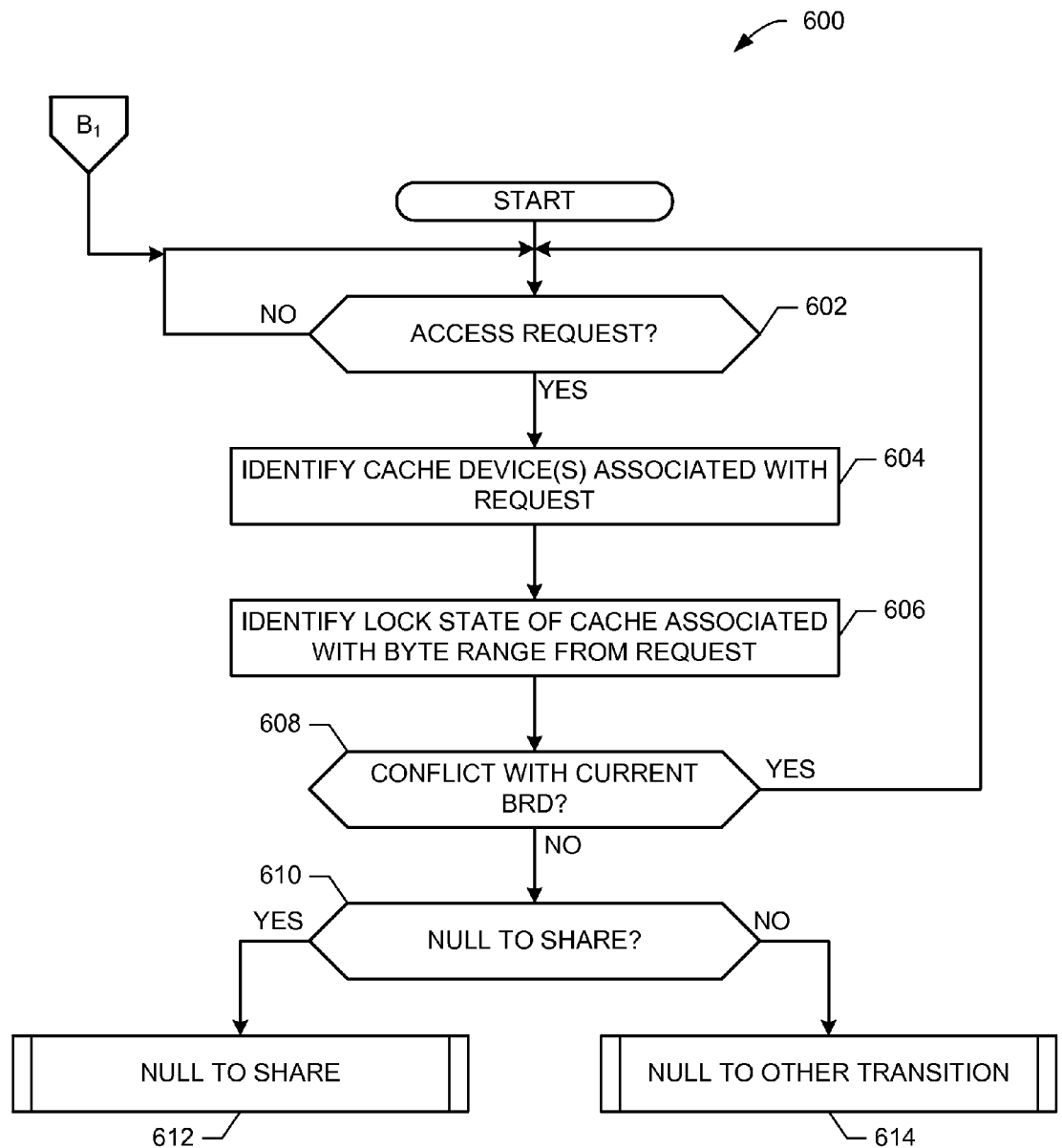

The program 600 of FIG. 6 begins at block 602 where the example host file request interface 302 and the example host bus interface 304 determine whether an access request has been received by the example host 202 or one or more nodes (e.g., node 216). In particular, the example access request manager 220 of the example node 216 monitors for one or more instances of an I/O call and, when a call occurs, signals the example remote cache client 222 to send the call request via the example bus 218 instead of one or more I/O path(s) associated with a network based file system (e.g., 112, 118). Similarly, the example access request manager 204 of the example host 202 monitors for one or more instances of an I/O call and, when a call occurs, signals the example delegation manager 206. Absent one or more access requests (e.g., I/O call(s)), the program 600 of FIG. 6 waits for the occurrence of a request (block 602). However, in response to an access request (block 602), the example host cache manager 306 or the example remote cache manager 308 identifies which cache device(s) are associated with the request (block 604). Although the illustrated example of FIG. 6 includes a loop (block 602) that monitors for circumstances associated with an access request, example methods, apparatus, systems and/or articles of manufacture disclosed herein do not perform blocking operations that may prevent one or more additional and/or alternate threads from independently executing. For example, in the event a first iteration of the example program 600 of FIG. 6, one or more additional threads may spawn to continue monitoring for an access request (block 602) while the remainder of the example program 600 executes. In other words, one or more examples of programs disclosed herein may include loops, but such loops may occur absent one or more blocking operation(s).

To prevent conflicting access to a currently locked portion of cache (e.g., a read request from node cache 224 and a corresponding exclusive byte range of cache on the host cache 208), the example host cache manager 306 and the remote cache manager 308 check corresponding lock state(s) (block 606). Lock states associated with all cache devices of the example host configuration 200 may be stored in a globally accessible tabular format consistent with Table 1. If the cache byte range associated with a received access request conflicts with current brd (block 608), the request is queued and the control returns to block 602 to await another instance of an access request (e.g., a call for read/write operation(s)).

Generally speaking, in the event a portion of a cache device, as identified by the brd, is conflicted (e.g., locked), other portion(s) of that same cache device may be operated on without conflict. In the event the brd associated with the access request is not conflicted (e.g., allowed) (block 608), the example lock manager 310 determines whether the access request is associated with a read (SHARE) or another type of transition (e.g., write (EXCLUSIVE) call) (block 610). Read-type access requests proceed to block 612, while other-type access requests proceed to block 614, each of which is discussed in further detail below.

Figure 7A:
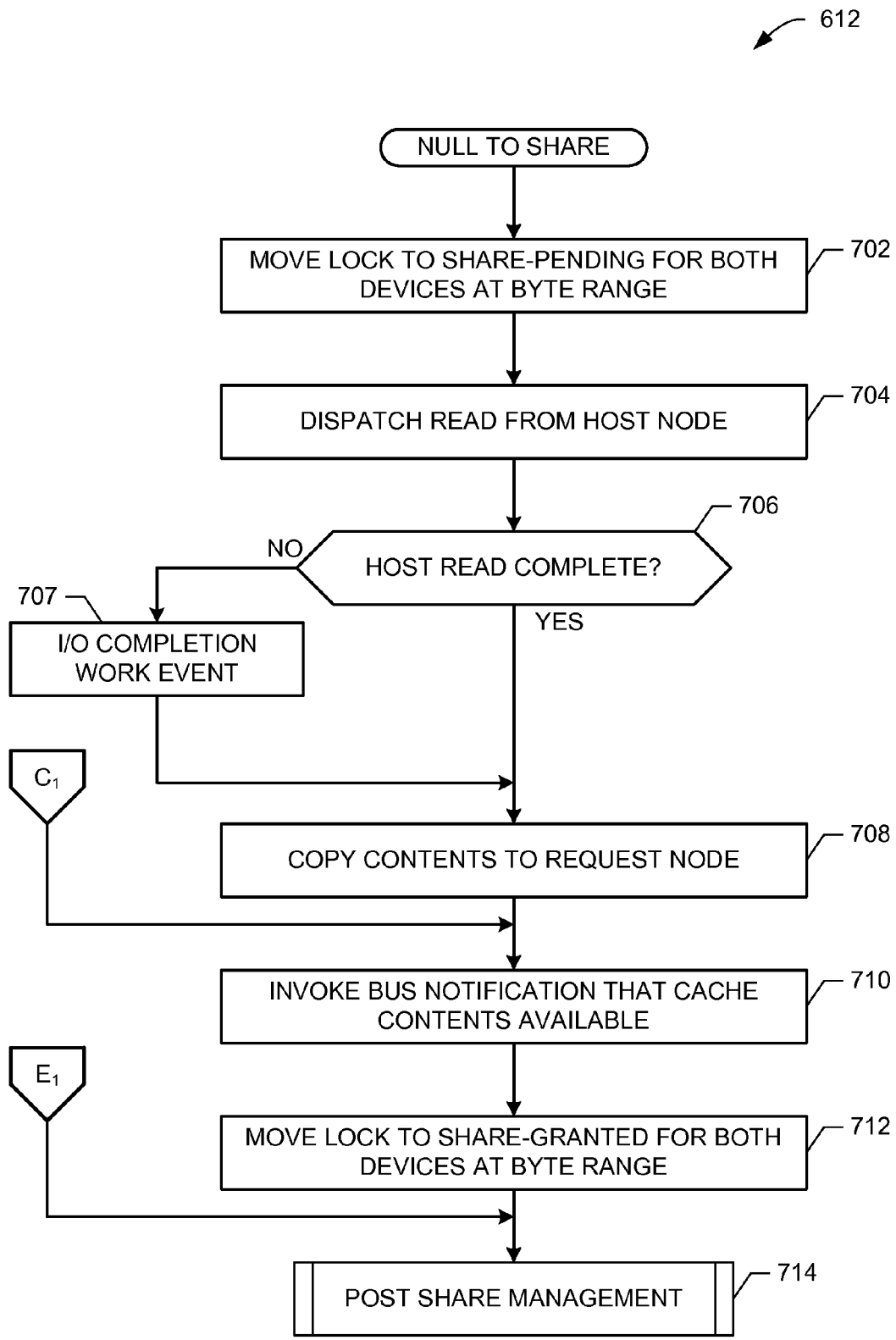

FIG. 7A illustrates additional detail associated with read-type access requests (block 612), including transitions from state NULL to state SHARE. As described above, the example execution of read-type access requests (block 612) may occur independently of the example program 600 of FIG. 6. Such independent execution (e.g., via one or more additional thread(s)) facilitates asynchronous (non-blocking) lock management operation(s). In the illustrated example of FIG. 7A, the example lock manager 310 moves a lock associated with a brd identified by the access request from state NULL to state SHARE-PENDING (block 702). The SHARE-PENDING state set by the example lock manager 310 is an intermediate state that is applied, via bus communication absent network layer(s), to both the requesting node cache (e.g., node cache 224 of node 216) and the corresponding shared portion(s) of the host cache (e.g., host cache 208 of the host 202). Any subsequent request(s) that may occur and targeted to the same brd will be denied access to the cache portion(s) associated with the brd during moments when the SHARE-PENDING state is true for both the node cache 224 and the host cache 208. When a requesting node, such as the example node cache 224, makes a request with a brd, the example lock manager 310 sequesters, via a non-network bus (e.g., PCI-E bus, bus 104), an associated portion of the host cache 208 and establishes both with the same cache lock state (e.g., SHARE-PENDING). Accordingly, in the event the example host configuration 200 includes additional nodes (e.g., a second node, third node, fourth node, etc.), each node may be associated with respective portions of the host cache 208 that are physically and logically separate. Such separate portions of the host cache 208 can operate in lock state synchronicity with respective node cache byte ranges so that each separate node can run independent processes in which corresponding process data is not intermixed. Read-in data is placed in the associated shared cache memory of the host cache 208 (dispatch) (block 704), and the example lock manager 310 determines whether the I/O operation is complete (block 706). If not, the example lock manager 310 schedules an IO completion work entity/event (block 707), which may wait and handle the dispatched read operation. As described above, such example I/O completion work event(s) (block 707) do not block and/or otherwise prohibit one or more alternate thread(s) that may execute in the example figures disclosed herein. Upon completion of the example I/O completion work event (block 707) or in the event the host I/O is complete (block 706), the example delegation manager 206 confirms one or more network(s) are bypassed and/or otherwise prevented from cache communication capability, and contents of the host cache 208 are copied via the example bus 218 to the brd portion of the requesting node (e.g., the node cache 224 of the node 216) (block 708). In some examples, the example delegation manager 206 may confirm one or more network(s) are bypassed and/or otherwise prevented from cache communication capability on a periodic basis, a scheduled basis, an aperiodic basis and/or in response to any communication attempt(s) between the example host 202 and the example node(s) 216.

To prevent the requesting node (e.g., node 216) from attempting to perform operation(s) on the cache associated with the brd prematurely (e.g., prior to all cache contents being copied to the example node cache 224), the example lock manager 310 invokes a bus notification message to the node 216 to inform it that the cache contents are available (block 710). In other words, the bus notification message alerts the requesting node that the read operation is complete and that the contents are available in the node cache 224, thereby reducing and/or otherwise eliminating additional communication bandwidth that would otherwise occur on the relatively more bandwidth limited network-based file system(s) and/or emulator(s). The example lock manager 310 replaces the intermediate SHARE-PENDING state with a SHARE-GRANTED state (block 712) and a post-share management is invoked (block 714). The example post-share management may occur in response to one or more additional and/or alternate thread spawn instances to maintain asynchronous operation of example methods, apparatus, systems and/or articles of manufacture disclosed herein.

Figure 7B:
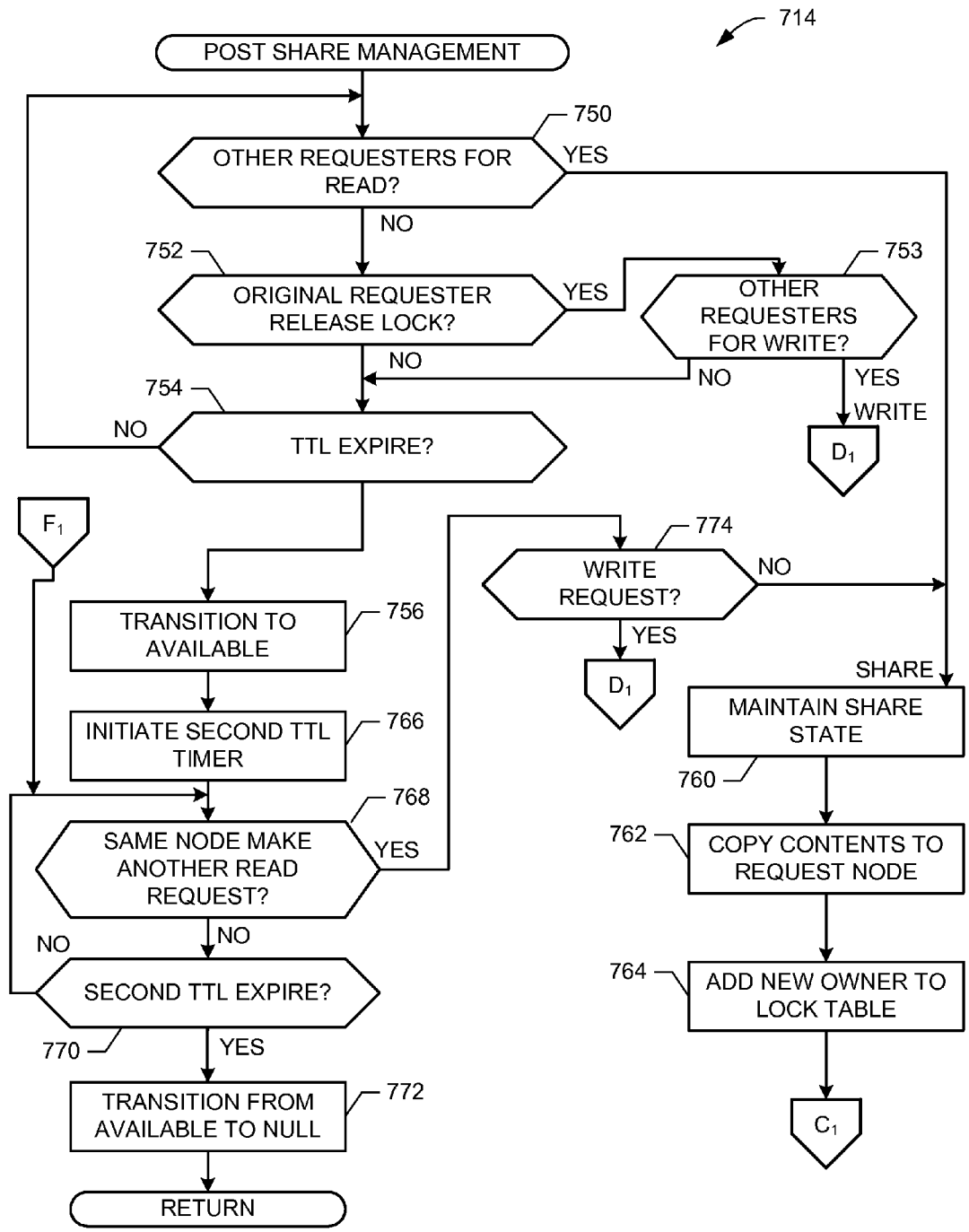

As discussed above, a lock in a SHARE state may transition to one or more subsequent lock states. FIG. 7B illustrates additional detail associated with post-share management (block 714). In the illustrated example of FIG. 7B, the example lock manager 310, which may operate in a manner similar to an event handler, invokes the example remote cache manager 308 and/or the example host cache manager 306 to determine whether to transition the lock to the AVAIL state when (a) there are no other requesting read nodes (block 750), (b) the requesting node released the lock (block 752), and (c) a time-to-live (TTL) threshold or timer has expired (block 754). In the event the above three conditions occur, the example remote cache manager 308 assigns the lock from the SHARE state to the AVAIL state (block 756). Stated differently, transitioning from the SHARE state to the AVAIL state prevents complete release of the read-type lock state, which reduces lock management resource consumption that would be needed to reacquire the read-lock state after a full lock release (e.g., NULL state). As described in further detail below, additional condition(s) may occur to transition further to the NULL state. In the event the original requester (e.g., the node responsible for the access request (block 602)) does not release the lock (block 752), the cache manager 306, 308 determines whether other requesters associated with a write exist (block 753). If not, control proceeds to block 754 to check for the expiration of the TTL threshold/timer. In other words, the remote cache manager 308 prevents control over the lock in perpetuity. On the other hand, if other requesters are associated with a write (block 753), control advances to the example program of FIG. 8A.

In the event other requesters for a read occur (block 750), the example remote cache manager 308 maintains a SHARE state for the lock on the cache portion associated with the brd (block 760). In other words, even if the original requester has not released the lock (block 752), one or more attempts to read may be permitted. Contents of the shared portion of the host cache 208 are copied, via the example bus 218, to the requesting node (block 762) and a new lock owner is identified in a lock table (block 764), such as the example Table 1 above. In some examples, before copying via the example bus 218 to the requesting node, the delegation manager 206 confirms that one or more network-based systems are bypassed from operation and/or otherwise handling the communication. As such, the copy may occur in a manner relatively faster than would otherwise occur using NBFS (e.g., 112, 118) and/or emulated layer(s) (e.g., 114, 120). As described above, to prevent the requesting node from accessing and/or otherwise attempting to use cache contents prior to a complete read operation, control advances to block 710, in which the example lock manager 310 invokes a bus notification message to the node 216 to inform it that the cache contents are available.

Returning to block 756, after the lock state transitions to AVAIL, a second TTL threshold or timer is initiated (block 766). The example second TTL timer allows the AVAIL state to be maintained for a finite amount of time in which additional read requests might occur. Generally speaking, the AVAIL lock state is an intermediate state invoked to improve computational efficiency associated with lock acquisition and release operations. Acquisition of a lock for a given brd from a NULL state to a SHARE state consumes a relatively greater amount of system resources than maintaining the SHARE state from a prior SHARE state. In some circumstances, a node may iterate any number of read requests in a relatively short period of time. If such requests occur, then preventing the lock from reverting back to the NULL state during each iteration saves valuable processing and/or bandwidth resources.

The event handler 310 determines whether the same node makes another read request (block 768) and, if not, checks to determine whether the second TTL timer has expired (block 770). As described above, the second TTL timer prevents the AVAIL state from maintaining exclusivity for an indefinite period of time. If the TTL timer expires (block 770), then the event handler 310 initiates a transition from AVAIL to NULL (block 772) that completes this event handling. However, if the TTL timer does not expire (block 770), the event handler 310 determines whether another request occurs (block 768). On the other hand, receipt of a write request (block 774) causes control to advance to FIG.

8A, as described in further detail below, and receipt of a read request (block 774) causes control to maintain a share state (block 760).

Figure 8A:
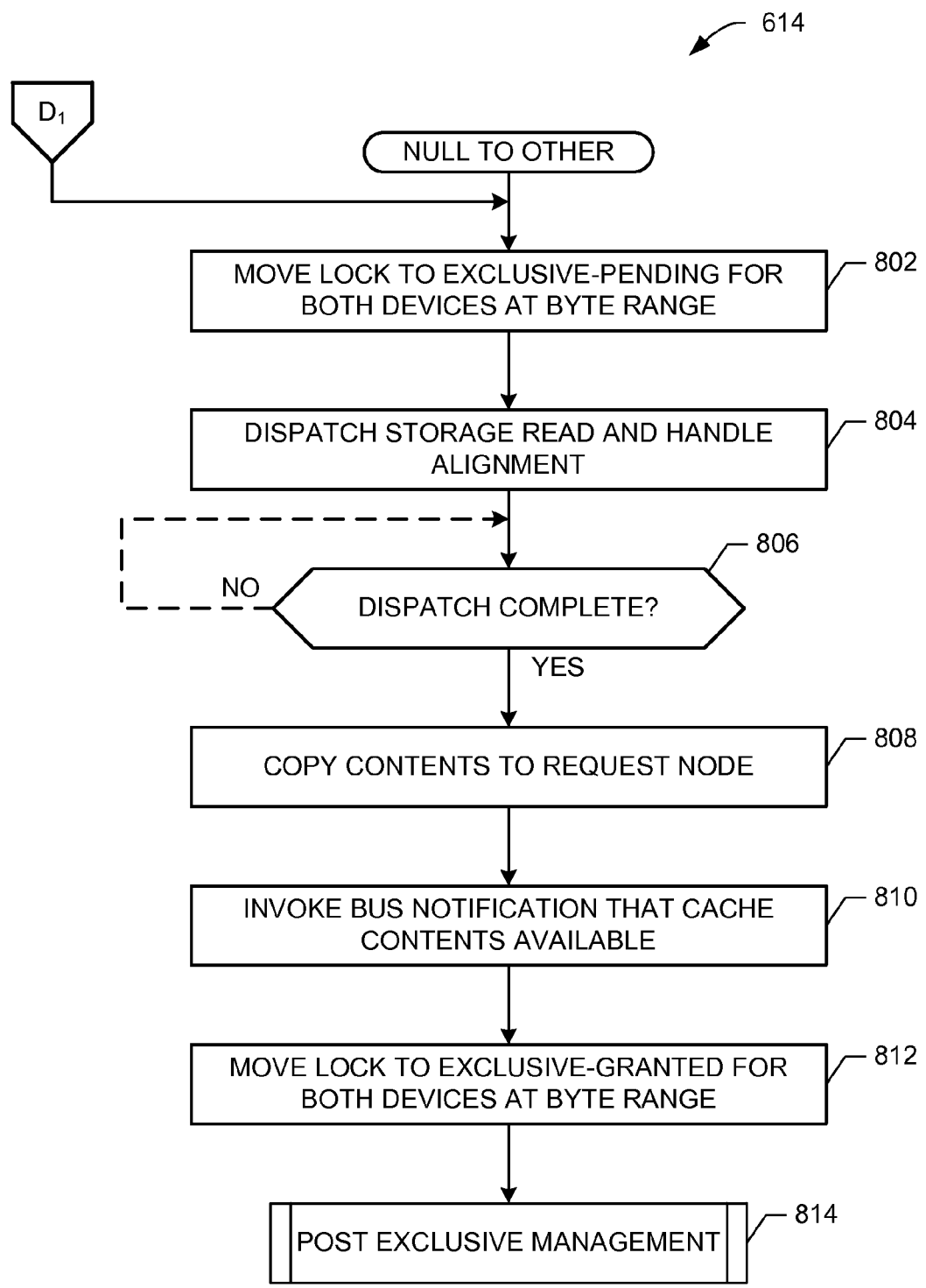

Briefly returning to FIG. 6, if the example lock manager 310 determines that an access request is associated with a non-share-type transition (e.g., write (EXCLUSIVE) call) occurs (block 610), then non-share-type access management is invoked (block 614). FIG. 8A illustrates additional detail associated with other transitiontype requests (block 614), including transitions from state NULL to state EXCLUSIVE. In the illustrated example of FIG. 8A, the example lock manager 310 moves a lock associated with a brd identified by the access request from state NULL to state EXCLUSIVE-PENDING (block 802). The EXCLUSIVE-PENDING state set by the example lock manager 310 is applied to both the requesting node cache (e.g., node cache 224 of node 216) and the corresponding shared portion(s) of the host cache (e.g., host cache 208 of the host 202). Any subsequent request(s) that may occur and targeted to the same brd as the request will be denied access to the cache portion(s) associated with that brd during the duration of the lock (during the EXCLUSIVE-PENDING state).

The example host node dispatches a storage read, taking into consideration whether the brd is unaligned (block 804). In other words, if the write operation spans multiple blocks, then each block must be read in its entirety prior to one or more write operations on byte portions within the block(s). The example lock manager 310 subsequently schedules a work event that waits for the IO completion (block 806—see dashed line). As described above, one or more work event(s) may be spawned as one or more threads to avoid instances of blocking, thereby maintaining an asynchronous operation. Upon IO completion, the work event handler copies contents to the request node (block 808). The request node (e.g., the node 216) is notified upon completion of the move (block 810) and the lock state is changed to EXCLUSIVE-GRANTED (block 812), and post-write management event is invoked (block 814).

Figure 8B:
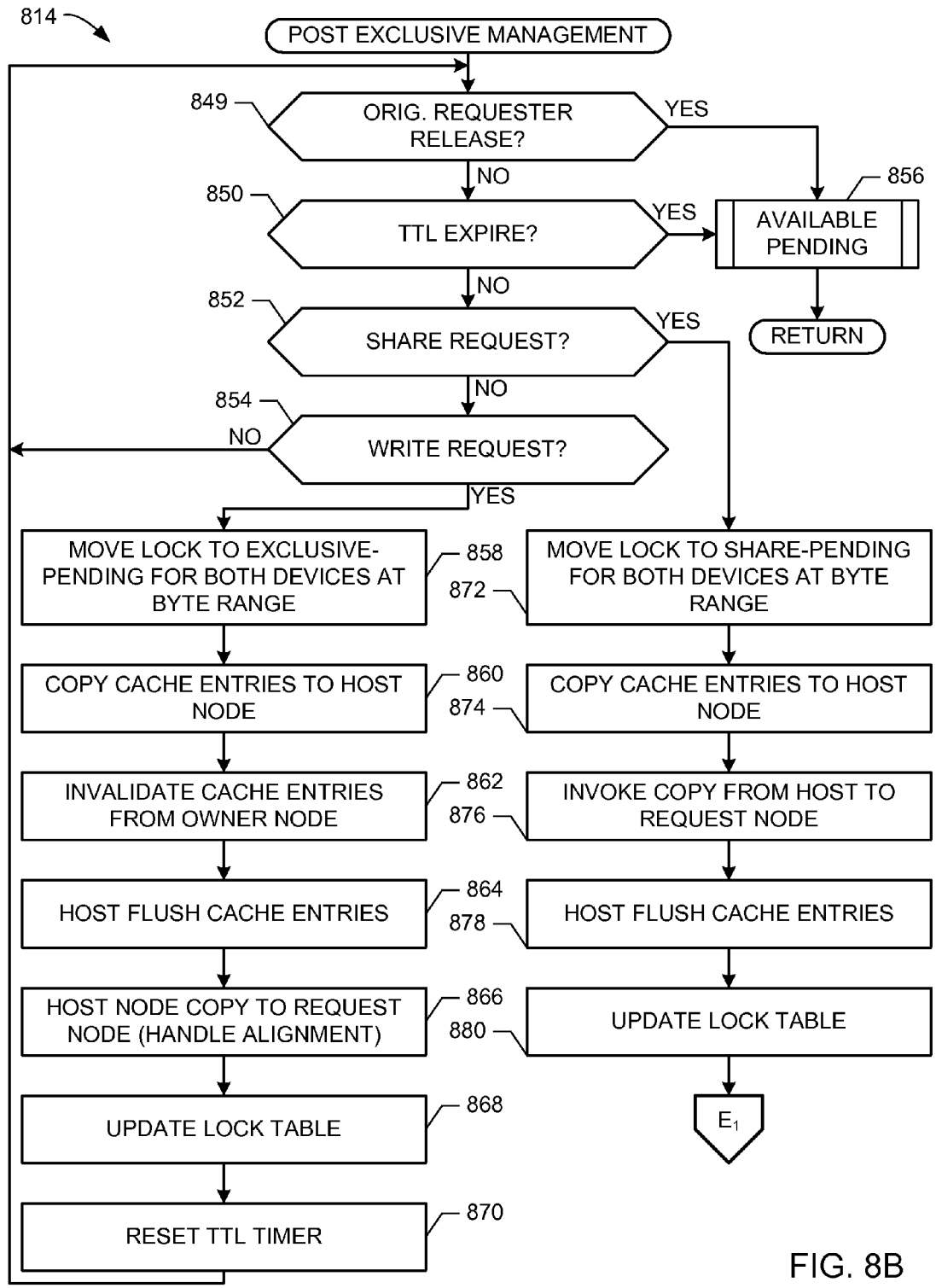

FIG. 8B illustrates additional detail associated with post-write management (block 814), which may operate and/or otherwise execute in an asynchronous manner. In the illustrated example of FIG. 8B, the example lock manager 310 determines whether the original requester released the lock (block 449). If so, control advances to block 856, in which the AVAIL-PENDING state is entered, as discussed in further detail in connection with FIG. 8C. On the other hand, if the original requester does not release the lock (block 849), then the example lock manager 310 sets a TTL timer and determines whether it has expired (block 850). Upon a first iteration of the program of block 814, the example TTL timer will not have expired at the onset (block 850), and the example lock manager 310 determines whether a share (read) request occurs (block 852). If not, then the lock manager 310 determines whether a write request occurs (block 854). If no write request occurs (block 854), then control returns to block 850 to determine whether the TTL timer has expired. As described above, the TTL timer prevents a monopoly on any particular state, and the duration of one or more TTL timer(s) can be adjusted and/or otherwise tuned. When the TTL timer expires (block 850), the example lock manager 310 sets the lock to the AVAIL-pending state (block 856), as described below in connection with FIG. 8C.

Figure 8C:
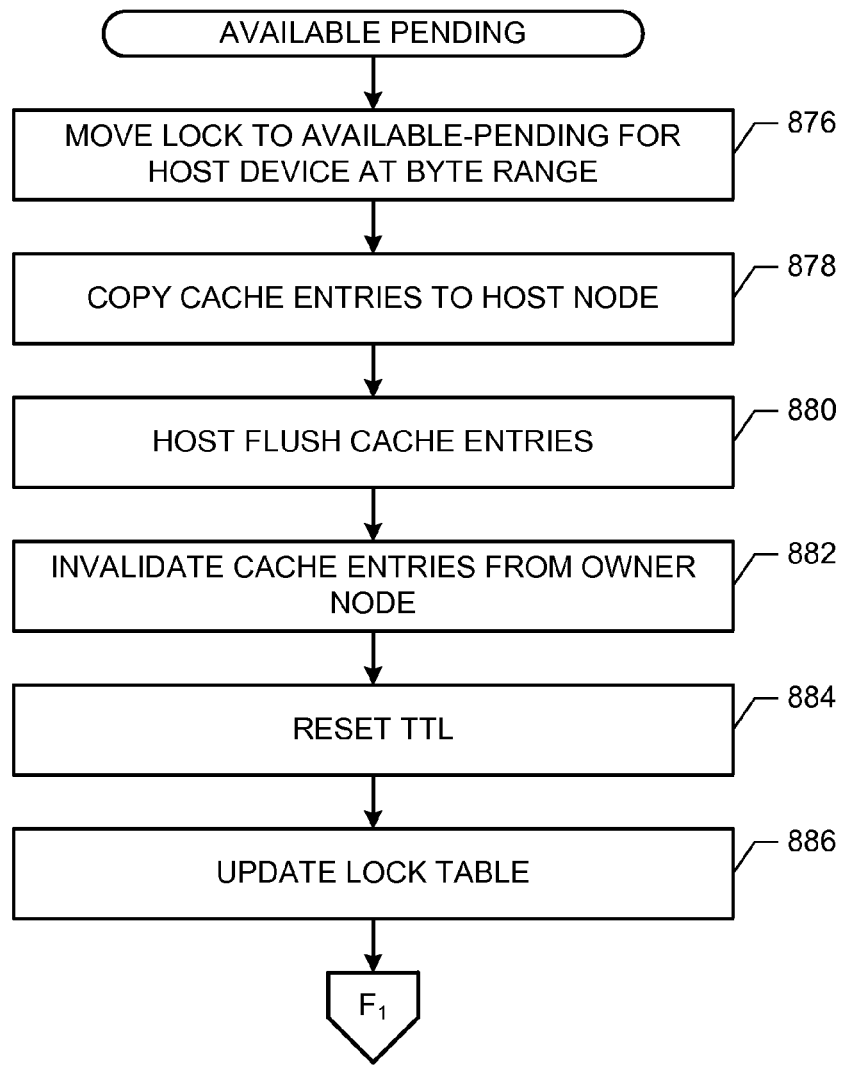

In the illustrated example of FIG. 8C, the lock is moved to an AVAIL-PENDING state for the host device at the byte range of interest (block 876). Cache entries are copied to the host node (block 878) and the example host flushes the cache entries (block 880). Additionally, cache entries are invalidated from the owner node (block 882) before resetting the example TTL timer (block 884). The lock table is updated to reflect the AVAIL state (block 886) and control returns to block 768 of FIG. 7B.

Returning to the illustrated example of FIG. 8B, in the event another write request occurs (block 854), then the event handler 310 sets the lock to an EXCLUSIVE-PENDING state for both cache devices involved in the write request (block 858). Cache entries associated with the write request are copied to the host node (block 860), and then invalidated (removed) from the owner node (e.g., the source of the write content) (block 862). The example host flushes the cache entries (block 864) and then copies the entries to the requesting node (block 866). As described above, multiple blocks may need to be written in the event the brd spans beyond 512 bytes. The lock table, such as example Table 1 above, is updated to reflect changes (block 868) and the TTL timer is reset (block 870) before control returns to block 850.

In the event a read request occurs (block 852), then the example lock manager 310 sets the lock to a SHARE-PENDING state for both cache devices involved in the read request (block 872). Cache entries are copied to the host node (block 874) and a copy operation is invoked from the host to the requesting node via the example bus 218 (block 876). The host flushes the cache entries (block 878) and updates the lock table to reflect the changes (block 880). Control advances to block 714 to manage post-share operation.

Figure 9:
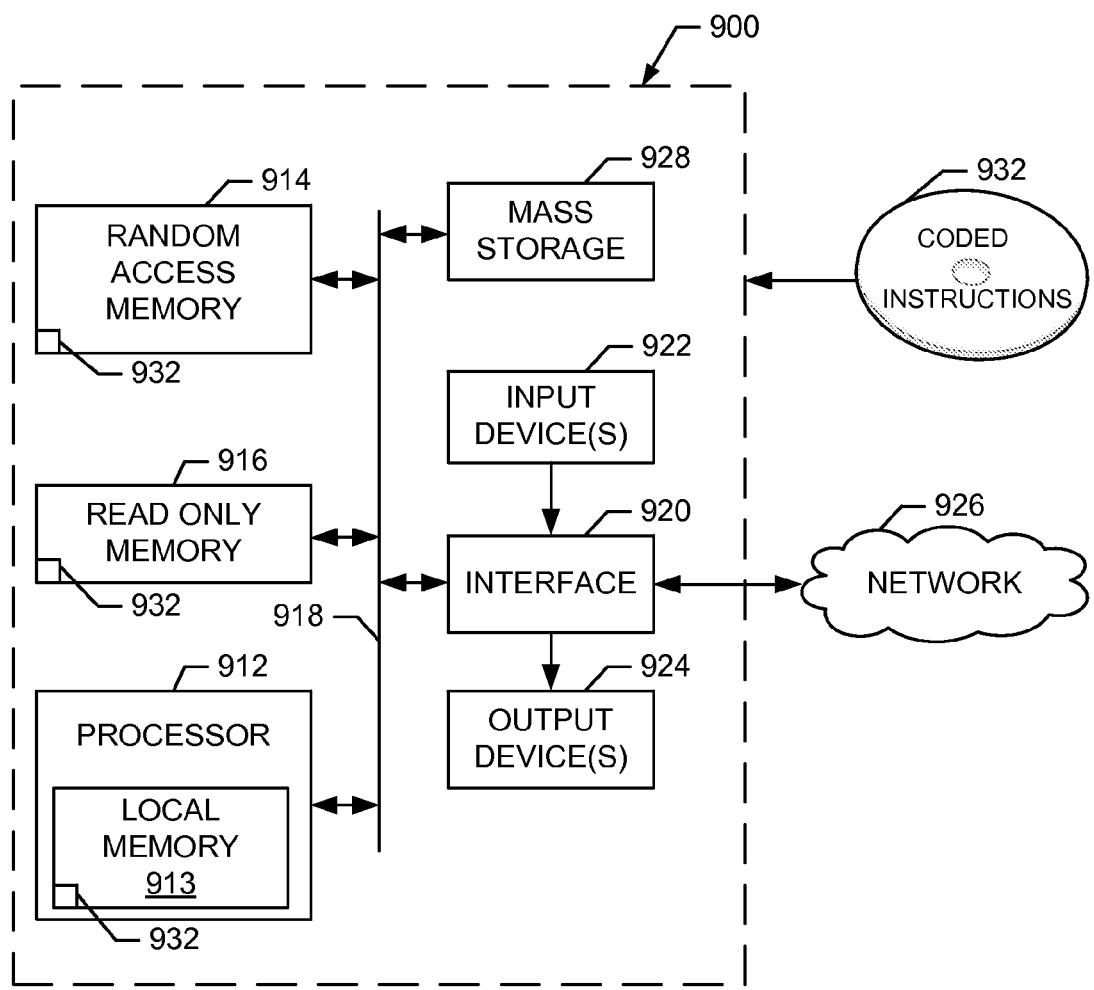
FIG. 9 is a block diagram of an example processor platform that may execute the example machine readable instructions of FIGS. 5, 6, 7A, 7B, 8A, 8B and 8C to implement the example delegation manager and example remote cache client of FIGS. 2-4.

FIG. 9 is a block diagram of an example processor platform 900 capable of executing the instructions of FIGS. 5, 6, 7A, 7B, 8A, 8B and 8C to implement the host configuration 200 of FIGS. 2-4. The processor platform 900 can be, for example, a server, a personal computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5, 6, 7A, 7B, 8A, 8B and 8C may be stored in the mass storage device 928, in the volatile memory 914, in the non-volatile memory 916, and/or on a removable tangible computer readable storage medium such as a CD or DVD.

From the foregoing, it will appreciated that the above disclosed methods, apparatus and articles of manufacture reduce node device networking layer burdens and associated bandwidth deficits. Shared cache states established between node cache byte ranges and associated portions of host cache facilitate bus transfer with a reduced overhead burden.

An example disclosed apparatus includes a remote cache manager to identify a remote cache memory communicatively connected to a bus, a delegation manager to constrain the remote cache memory to share data with a host cache memory via the bus, and a lock manager to synchronize the host cache memory and the remote cache memory with a common lock state. Other example disclosed apparatus include the delegation manager to block a network layer from communicating with the remote cache memory. Some example apparatus include the remote cache manager to detect an authorization code sent by a remote cache client prior to constraining a network-based layer, while still other example apparatus include the delegation manager to bypass host network layer communication protocols. Some example apparatus include the remote cache manager to initiate the remote cache memory to a NULL state, wherein the bus comprises at least one of a peripheral component interconnect (PCI) bus or a PCI express bus. In other example apparatus a block alignment manager is to establish an intermediate state for the remote cache associated with a first byte range in response to a first access request, and establish the intermediate state for a portion of the host cache equal to a size associated with the first byte range. In some examples, the delegation manager is to block access to the first byte range by a second access request when the intermediate state is true on the remote cache and the host cache. In still other examples, a bus interface is to invoke a bus notification message from a host associated with the host cache memory to a node device in response to cache data transfer completion. Some examples include a lock manager to facilitate a cache read request for a first request node, the first request node to acquire a read lock associated with a first byte range, in which the lock manager is to prevent release of the read lock for a time-to-live duration in response to a release by the first request node. Still other examples include the lock manager to transition the read lock to an available state to reduce lock management resource consumption. In some examples the delegation manager is to maintain asynchronous execution while constraining the remote cache memory via the bus.

Example methods disclosed herein include identifying a remote cache memory communicatively connected to a bus, constraining the remote cache memory to share data with a host cache memory via the bus, and synchronizing the host cache memory and the remote cache memory with a common lock state. Some example methods include blocking a network layer from communicating with the remote cache memory. Other example methods include detecting an authorization code sent by a remote cache client prior to constraining a network-based layer. Still other example methods include bypassing host network layer communication protocols, and initiating the remote cache memory to a NULL state. Other methods include the bus including at least one of a peripheral component interconnect (PCI) bus or a PCI express bus, establishing an intermediate state for the remote cache associated with a first byte range in response to a first access request, and establishing the intermediate state for a portion of the host cache equal to a size associated with the first byte range. Some methods include blocking access to the first byte range by a second access request when the intermediate state is true on the remote cache and the host cache, and/or invoking a bus notification message from a host associated with the host cache memory to a node device in response to cache data transfer completion. Some methods facilitate a cache read request for a first request node, the first request node to acquire a read lock associated with a first byte range, preventing release of the read lock for a time-to-live duration in response to a release by the first request node, and transitioning the read lock to an available state to reduce lock management resource consumption. Some methods maintain asynchronous execution while constraining the remote cache memory via the bus, and some methods confirm a network-based communication system is bypassed before copying via bus.

Example computer readable storage mediums disclosed herein include instructions that cause a machine to identify a remote cache memory communicatively connected to a bus, constrain the remote cache memory to share data with a host cache memory via the bus, and synchronize the host cache memory and the remote cache memory with a common lock state. Other example instructions cause the machine to block a network layer from communicating with the remote cache memory. Some example instructions cause the machine to detect an authorization code sent by a remote cache client prior to constraining a network-based layer. Other example instructions cause the machine to bypass host network layer communication protocols when constraining the remote cache memory. In still other examples, the instructions cause the machine to initiate the remote cache memory to a NULL state, establish an intermediate state for the remote cache associated with a first byte range in response to a first access request, and establish the intermediate state for a portion of the host cache equal to a size associated with the first byte range. Some examples cause the machine to block access to the first byte range by a second access request when the intermediate state is true on the remote cache and the host cache, invoke a bus notification message from a host associated with the host cache memory to a node device in response to cache data transfer completion, and facilitate a cache read request for a first request node, the first request node to acquire a read lock associated with a first byte range. Other example instructions cause the machine to prevent release of the read lock for a time-to-live duration in response to a release by the first request node and/or transition to an available state to reduce lock management resource consumption.

Example systems disclosed herein include means for identifying a remote cache memory communicatively connected to a bus, means for constraining the remote cache memory to share data with a host cache memory via the bus, and means for synchronizing the host cache memory and the remote cache memory with a common lock state. Some example systems include means for blocking a network layer from communicating with the remote cache memory, means for detecting an authorization code sent by a remote cache client prior to constraining a network-based layer, and means for bypassing host network layer communication protocols when constraining the remote cache memory. Other example systems include means for initiating the remote cache memory to a NULL state, means for establishing an intermediate state for the remote cache associated with a first byte range in response to a first access request, and means for establishing the intermediate state for a portion of the host cache equal to a size associated with the first byte range. Some examples include means for blocking access to the first byte range by a second access request when the intermediate state is true on the remote cache and the host cache, while other examples include means for invoking a bus notification message from a host associated with the host cache memory to a node device in response to cache data transfer completion. Other examples include means for facilitating a cache read request for a first request node, the first request node to acquire a read lock associated with a first byte range and/or means for preventing release of the read lock for a time-to-live duration in response to a release by the first request node. While still other systems include means for reducing lock management resource consumption by transitioning the read lock to an available state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage cache memory, comprising: a remote cache manager to detect an authorization code sent by a remote cache client; a delegation manager to constrain a remote cache memory associated with the remote cache client to share data with a host cache memory via a bus in response to the detection of the authorization code; and
a lock manager to initialize the host cache memory and the remote cache memory to a common lock state, wherein the lock manager is to facilitate a cache read request from a first request node, the first request node is to acquire a read lock associated with a first byte range, and the lock manager is to prevent release of the read lock for a time-to-live duration in response to a release by the first request node, at least one of the delegation manager or the lock manage implemented via hardware.

2. The apparatus as defined in claim 1, wherein the delegation manager is to block a network layer from communicating with the remote cache memory.

3. The apparatus as defined in claim 1, wherein the delegation manager is to bypass host network layer communication protocols.

4. The apparatus as defined in claim 1, wherein the lock manager is to transition the read lock to an available state to reduce lock management resource consumption.

5. A method to manage cache memory, comprising: detecting an authorization code sent by a remote cache memory; constraining, with hardware, the remote cache memory to share data with a host cache memory via a bus in response to the detection of the authorization code; and
initializing, with hardware, the host cache memory and the remote cache memory to a common lock state, wherein the common lock state facilitates a cache read request for a first request node, and further including accessing a read lock associated with a first byte range to the first request node, and preventing release of the read lock for a time-to-live duration in response to a release by the first request node.

6. The method as defined in claim 5, wherein the constraining of the remote cache memory further includes blocking a network layer from communicating with the remote cache memory.

7. The method as defined in claim 5, wherein the constraining of the remote cache memory further includes bypassing host network layer communication protocols.

8. The method as defined in claim 5, wherein the remote cache memory is communicatively connected to at least one of a peripheral component interconnect (PCI) bus or a PCI express bus.

9. The method as defined in claim 5, further including transitioning the read lock to an available state to reduce lock management resource consumption.

10. A tangible computer readable storage device or storage disk comprising instructions that, when executed, cause a machine to, at least:
identify a remote cache memory communicatively connected to a bus by detecting an authorization code;
constrain the remote cache memory to share data with a host cache memory via the bus in response to the detection of the authorization code; and
initialize the host cache memory and the remote cache memory to a common lock state;
facilitate a cache read request for a first request node, the first request node to acquire a read lock associated with a first byte range, wherein the instructions cause the machine to prevent release of the read lock for a time-to-live duration in response to a release by the first request node.

11. The storage device or storage disk as defined in claim 10, wherein the instructions cause the machine to block a network layer from communicating with the remote cache memory.

12. The storage device or storage disk as defined in claim 10, wherein the instructions cause the machine to bypass host network layer communication protocols when constraining the remote cache memory.

13. The storage device or storage disk as defined in claim 10, wherein the instructions cause the machine to transition to an available state to reduce lock management resource consumption.

14. The apparatus as defined in claim 1, wherein the common lock state is an initial common lock state of NULL.

15. The method as defined in claim 5, wherein the common lock state is an initial common lock state of NULL.

16. The storage device or storage disk as defined in claim 10, wherein the common lock state is an initial common lock state of NULL.

\* \* \* \* \*